Oct. 16, 1934.　　　C. R. KUZELL　　　1,976,735
TREATMENT OF SULPHIDE ORES
Filed Dec. 29, 1930　　　3 Sheets-Sheet 2
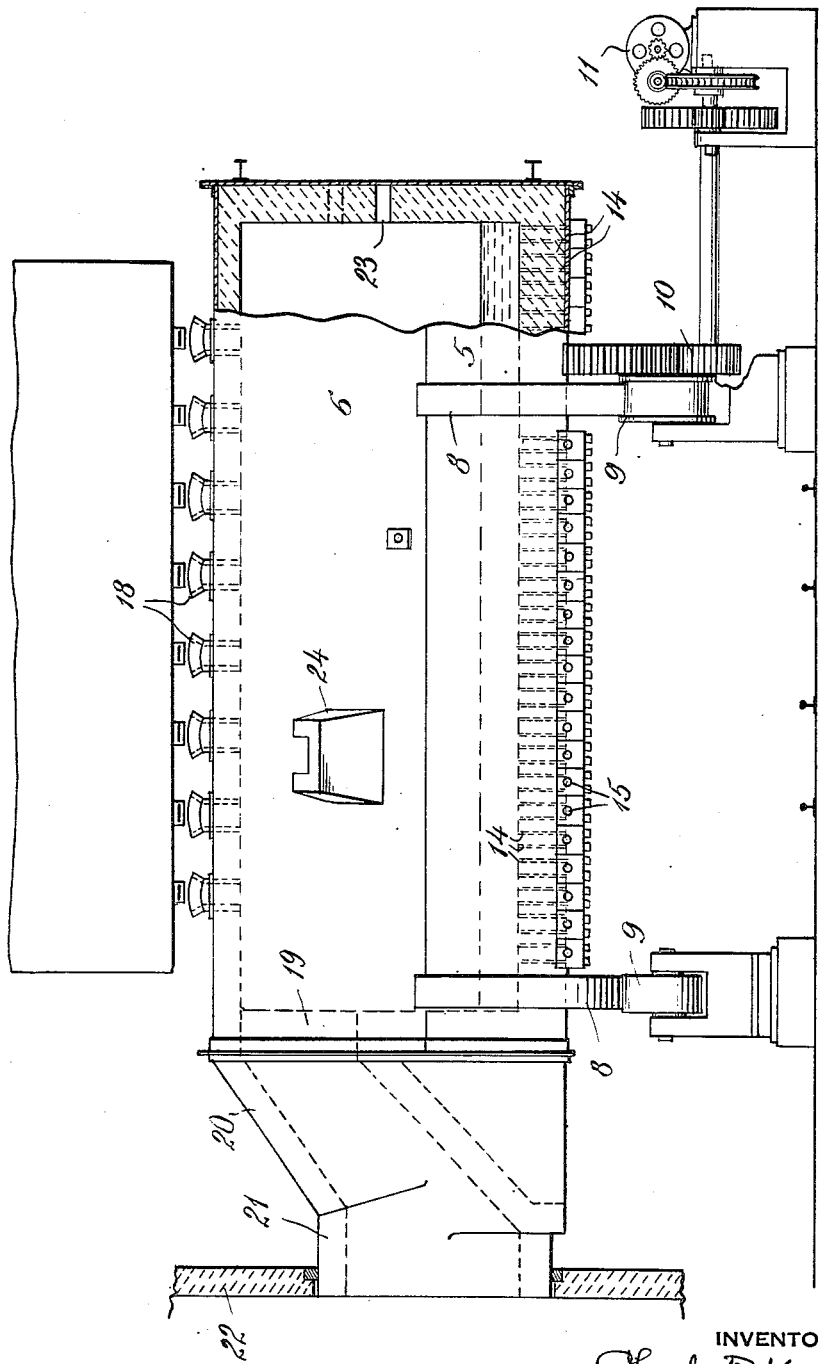
INVENTOR
Charles R. Kuzell
BY
Pennie, Davis, Marvin & Edmonds
ATTORNEYS Oct. 16, 1934.  C. R. KUZELL  1,976,735
TREATMENT OF SULPHIDE ORES
Filed Dec. 29, 1930  3 Sheets-Sheet 3
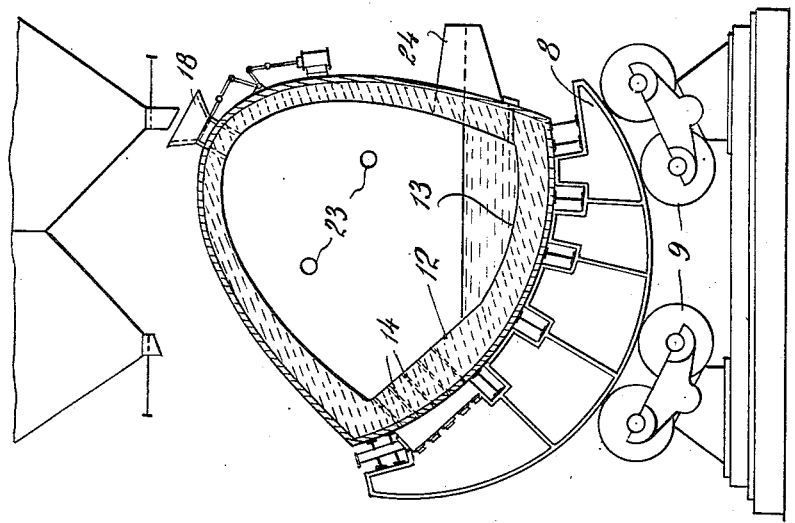
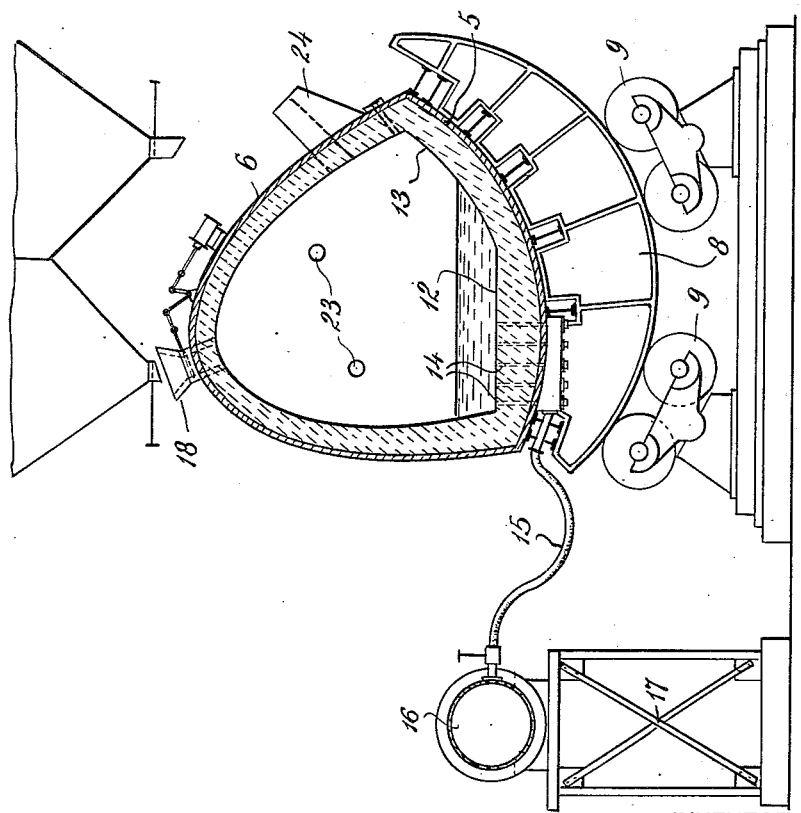
INVENTOR
Charles R. Kuzell
BY
Pennie, Davis, Marvin & Edmond
ATTORNEYS Patented Oct. 16, 1934

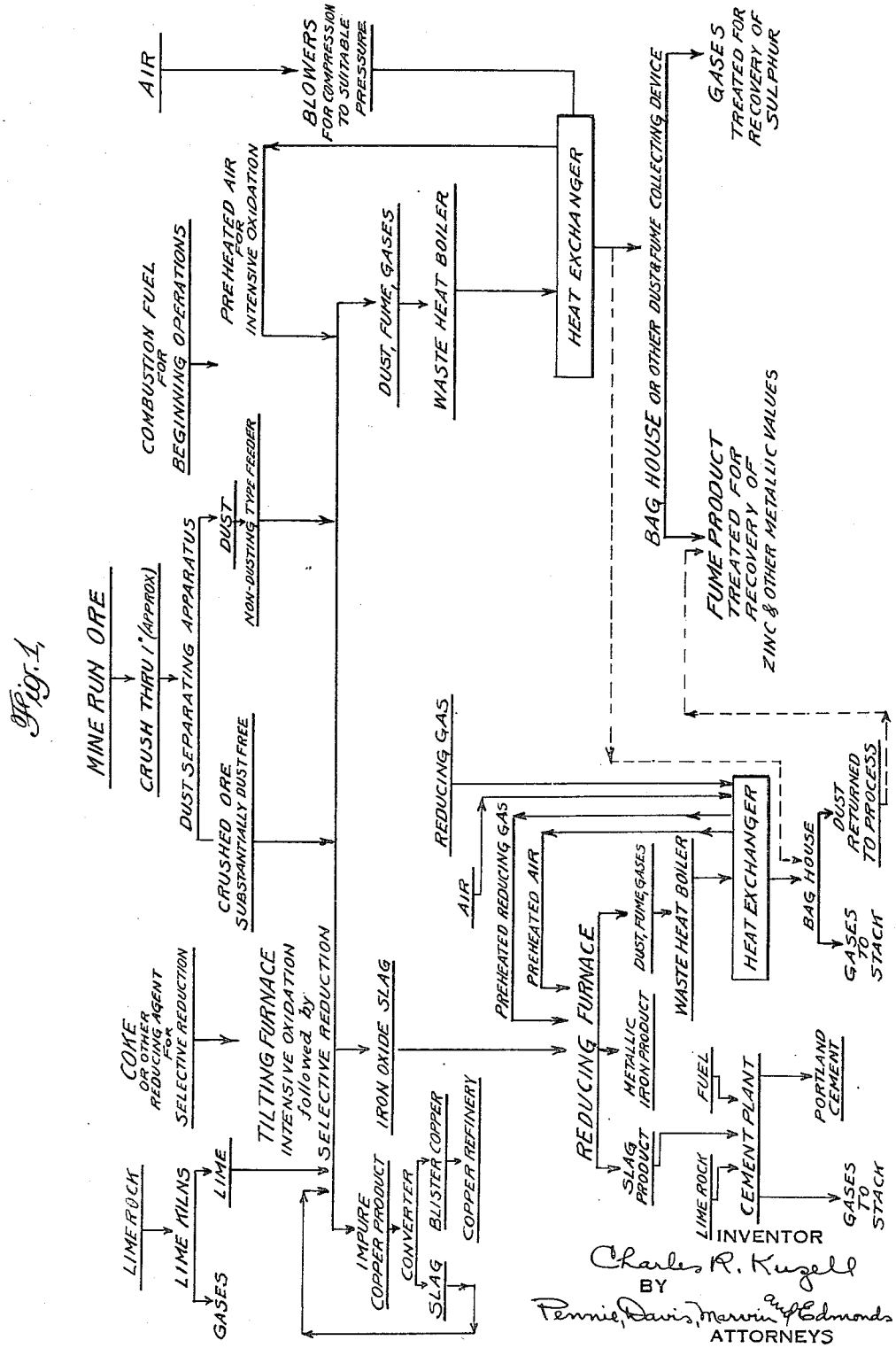

1,976,735

UNITED STATES PATENT OFFICE 1,976,735

TREATMENT OF SULPHIDE ORES

Charles R. Kuzell, Clarkdale, Ariz.

Application December 29, 1930, Serial No. 505,250

23 Claims. (Cl. 75—17)

This invention relates to the treatment of sulphide ore, and has for its general object the provision of an improved method of treating such ores. While the invention is peculiarly amenable to the treatment of ordinary run-of-mine ore, it may be advantageously applied to the treatment of concentrates and other mineral and metallurgical products containing metallic sulphides, and throughout this specification and the appended claims I have used the term "ore" to include and cover all such products. The invention is more particularly concerned with the treatment of ores containing sulphides of iron and copper, and usually containing in addition sulphides or other compounds of other metals, such as gold, silver, zinc, lead, cadmium, selenium, arsenic, antimony, thallium, germanium, cobalt, nickel, tin, etc., and usually containing earthy constituents or gangue minerals such as quartz and silicates. The invention has for one of its particular objects the provision of a method of treating such sulphide ores which makes possible more economic mining of an ore body than is possible in the heretofore customary selective mining practices. A further object of the invention is the provision of an improved method of treating such sulphide ores for the recovery of practically all of the metals and metalloids therein in the form of marketable products. Other objects of the invention will be brought out in the course of the following description.

Generally and briefly the invention contemplates a series of alternate oxidizing and reducing operations in the course of which the metals and metalloids in the ore are selectively isolated and recovered substantially in their entirety as valuable commercial products. The oxidizing and reducing operations may be considered as in the nature of alternate titrations with oxygen and reducing agent, preferably with such over-oxidation and over-reduction as to insure completeness in the characteristic reactions of each operation. The invention thus involves a pyrometallurgical treatment of a mixed or complex sulphide ore in which the successive oxidizing and reducing operations are selective separating or concentrating steps in each of which a practically complete stage of dissection is attained.

The invention is based on the fact that ferrous oxide (FeO) and magnetite (Fe$_3$O$_4$) can be maintained liquid without the fluxing assistance of silica at temperatures obtainable by the intensive oxidation of iron and sulphide. With sufficiently intensive oxidation, the molten bath so produced will include (by liquation, solution, chemical combination or otherwise) all of the constituents of the ore, whether oxidized or not, which are not volatilizable under the conditions of the oxidizing treatment. Since the intensity of the oxidation is dependent to some extent upon the amount of oxidizable constituents in the ore, an ore to be amenable to the contemplated treatment must contain (naturally or admixed therewith) adequate oxidizable constituents (such as metallic sulphides) for the practical attainment of the desired intensive oxidation.

Based on these principles, the invention contemplates the intensive oxidation of a mixed or complex sulphide ore containing iron with the production of (1) a gaseous product containing the bulk of the sulphur and such part of the other volatilizable constituents of the ore as volatilize during the oxidizing treatment, and (2) a molten product containing iron oxide or oxides and the other non-volatile constituents of the resulting oxidized ore. It is characteristic of this phase of the invention that the ore charge undergoing intensive oxidation contains such an amount of natural fuel, such as iron sulphide, as to insure fusion of the resulting oxidized ore without the fluxing assistance of silica at the temperatures attained. While the ore may and usually will contain some silica, the amount of silica present is usually and preferably considerably less than required to form an iron silicate slag with all the iron present. In other words, ferrous oxide and/or magnetite are depended upon to impart the desired fluidity to the oxidized ore, and silica is not present or included in the charge for the purpose of forming a slag with such iron oxides, as is customary in the ordinary practices of pyritic smelting. The intensive oxidation is preferably carried to the stage of considerable over-oxidation, that is until considerable iron has been oxidized to magnetite. This permits the attainment of relatively higher temperatures, thereby promoting the elimination (with subsequent recovery) of volatilizable constituents (such as sulphur, zinc, lead, cadmium, etc.). Since all of the volatilizable constituents of the ore can rarely be completely volatilized under the conditions prevailing during the intensive oxidation, only such part thereof is removed and included in the gaseous product as is volatile under the prevailing conditions, the remaining part being removed and recovered in succeeding operations.

The intensive oxidation of the ore may be carried out by passing an oxidizing gas, such as air, through or in contact with a charge of the ore heated to a sufficiently high temperature to effect ready burning or oxidation of the sulphides in the ore. The oxidation is of sufficient exothermic intensity to form a molten product of the resulting oxidized ore. In the course of this oxidizing treatment, the sulphur content of the ore is in large part burned or oxidized to sulphur dioxide (with perhaps a small amount of sulphur trioxide) and some part of the volatilizable constituents of the ore (such as zinc, lead, etc.) are volatilized; copper for the most part is converted optionally to copper sulphide, metallic copper, copper oxide, or mixtures thereof; and iron is converted to oxides thereof preferably with the formation of a considerable quantity of magnetic oxide of iron. The oxidizing treatment may be advantageously conducted by blowing an oxidizing gas through a molten bath resulting from a preceding operation or resulting from the oxidizing treatment itself, raw ore being added continuously or intermittently to the operation and melted by the heat of the oxidizing reactions until an appropriate amount of a molten oxidized ore has been formed. The oxidation is continued until substantially all of the sulphur (or alternatively substantially all of the sulphur not combined with copper) has been oxidized and removed as sulphur oxides with the gaseous product of the operation. The bulk of the copper will then be present in the molten oxidized ore as copper sulphide, metallic copper, or copper oxide, depending upon the completeness of the oxidizing treatment, and the iron will preferably be present largely in the form of magnetite, with some ferrous oxide or ferrous silicate slag depending upon the amount of silica naturally present in the ore.

The molten product of the oxdizing treatment is subjected to a differential or selective reduction treatment with the production of (1) a gaseous product containing a further part of the volatilizable constituents of the ore, (2) a molten copper product, and (3) a molten iron oxide product. The principal aim of the fractional or selective reducing treatment is to reduce the iron content of the molten oxidized ore to the ferrous state, with perhaps some metallic iron. The copper content of the molten oxidized ore, if present as copper sulphide, may remain wholly or partly as such, but if present as copper oxide will be reduced to metallic copper. Any appropriate reducing agent may be employed in this selective reduction step. Thus, a reducing gas or an atomized reducing agent may be blown through the molten oxidized ore, and sufficient air, or other combustion-supporting gas, may be admitted above the molten mass to burn or oxidize such portion of the reducing gas or agent as passes unconsumed through the molten bath. A solid carbonaceous reducing agent, such as coke, may be added to the molten oxidized ore and appropriately mixed therewith, as for example by blowing air or other appropriate gas through the molten mass and thereby agitating it. In any case, sufficient air, or other combustion-supporting gas, is admitted above the molten mass to complete the combustion of the reducing agent and assist in maintaining the temperature. As a result of this selective reducing treatment, there is obtained an impure molten copper product, containing perhaps a small percentage of iron, and a molten iron oxide product consisting for the most part of ferrous oxide and/or ferrous oxide slag.

The molten copper product may advantageously be subjected to an oxidizing treatment, generally resembling the converter treatment of copper matte. In the course of this oxidizing treatment, the copper, if not already present in the metallic state, is converted to metallic copper, and the iron is oxidized and may be converted to slag by the addition of appropriate slag-forming material. The blister copper resulting from this treatment contains the gold and silver and may be cast and refined in the manner now customary in the industry. The slag produced is advantageously returned to the oxidizing treatment of the raw ore.

The iron oxide product resulting from the selective reducing treatment is subjected, while still molten, to the action of an appropriate reducing agent. To this end it is advantageous to blow an atomized reducing agent or a reducing gas through the molten mass, while admitting sufficient combustion-supporting gas above the mass to complete the oxidation of the reducing agent. This reducing operation is conducted in the presence of appropriate slag-forming constituents, such as silica, lime, calcium fluoride, or the like, which may be originally present in the raw ore or may be added in the first oxidizing treatment, or may be added in either of the reducing treatments. As a result of this operation, there is obtained a gaseous product containing the remaining volatilizable constituents of the ore, a metallic iron product, which will usually contain a relatively small amount of copper, and a slag product which may advantageously be utilized in the manufacture of cement.

The practical application of the invention will be better understood from the following description taken in connection with the accompanying drawings in which Fig. 1 is a flow sheet of a plant embodying the invention in its complete aspect;

Fig. 2 is a side elevation partly in section of a tilting furnace particularly adapted for carrying out the oxidizing and selective reducing treatments of the invention, and Figs. 3 and 4 are cross-sectional elevations of the tilting furnace in two of its principal operating positions.

Referring first to Figs. 2, 3 and 4, there is shown a tilting furnace resembling generally the barrel type copper converter. This particular furnace is to be taken as merely illustrative of suitable apparatus for the practice of the invention, various other forms and types of apparatus being available therefor. The furnace shown in the drawings comprises a steel shell made up of an arched bottom section 5 and an arch-shaped top section 6, lined with appropriate heat and corrosion-resistant material, such for example, as magnesite brick. The bottom section 5 of the furnace shell is attached to cradles 8 supported on roller bases 9, one or more of the rollers of which is adapted to be driven by a gear train 10 and driving motor 11 for tilting the furnace into its various operating positions.

The bottom lining of the furnace is longitudinally divided into two approximately equal sections, one of which (12) is substantially flat and the other (13) is arched. The bottom of the furnace is provided with uniformly and relatively closely spaced tuyères 14, extending the entire length of the furnace and inwardly for approximately half the width of the flat bottom lining 12. The tuyères are connected by flexible hose 15 to the main air (or other oxidizing gas) pipe 16 appropriately supported on a frame-work 17.

The furnace has along its top a series of charging openings 18 which are appropriately closed during the normal operation of the furnace. At one end, the furnace has a relatively large gas exit opening 19 communicating with a closed flue system (not shown) by means of a neck 20 secured at one end to the furnace and terminating at its other end in a cylindrical element 21 axially aligned with the rotatable axis of the furnace and extending into a registering opening in the stationary end 22 of the closed flue system. Burners 23 for gas or atomized fuel extend into the furnace at the end opposite the gas exit. A tap hole and cooperating spout 24 for withdrawing molten products from the furnace are provided on the side thereof.

Considering now the flowsheet of Fig. 1, the raw run-of-mine sulphide ore is first appropriately crushed, say to pass through a one-inch mesh screen. It is advantageous to separate the dust from the crushed ore in order to facilitate feeding of the crushed ore into the oxidizing furnace and in order to avoid dusting nuisance. The dust is thus separately fed into the furnace through any appropriate non-dusting type of feeder, and the substantially dust-free crushed ore is separately fed into the furnace through an appropriate type of feeder therefor.

The appropriately crushed ore is fed into the furnace in which the oxidizing treatment can be conveniently carried out. The tilting furnace illustrated in the drawings is particularly adapted for the purpose. A small amount of the final molten charge of the preceding operation may be retained in the furnace, and the furnace is highly heated as a result of the preceding operation. The furnace is positioned (Fig. 3) so that its tuyères are covered to a sufficient depth with the molten mass within the furnace, and the oxidizing gas, such, for example, as preheated air, is blown through the tuyères into the furnace, say at a pressure of 10 to 20 pounds. At the same time, the crushed ore is fed into the furnace at approximately the rate at which the heat developed within the furnace will fuse or melt the oxidized ore. While oxidizing gas at ordinary atmospheric temperature may be introduced into the furnace, I prefer to preheat this gas, say to a temperature of 800° to 1000° F., since I find that the operation proceeds more smoothly with preheated gas. I also prefer to introduce into this furnace, along with the crushed ore, such amount of slag-forming material (such as lime, fluor-spar, and the like) as may be required in subsequent operations, the idea being to utilize the excess heat of the oxidizing treatment to melt the slag-forming material.

As the oxidation treatment proceeds, the oxidized ore and slag-forming material melt, and the sulphur and other volatile constituents pass off from the furnace in the gaseous product. The operation is continued until practically all of the sulphur has been removed, at which time the entire charge will be molten with a large part of the iron in the form of magnetite. The copper will be in the form of copper oxide if the degree of oxidation has been carried far enough for the maximum removal of sulphur. Otherwise, some or even all of the copper may be present as sulphide or as metallic copper.

The tilting furnace is now turned so that the tuyères 14 are above the level of the molten oxidized ore (Fig. 4). An appropriate amount of coke, or other suitable reducing agent, is introduced into the furnace and mixes with the molten mass. The furnace may, if desired, be provided with auxiliary tuyères through the arched bottom section 13 and preheated air or other appropriate gas may be blown through these tuyères in sufficient volume to agitate the molten mass and thereby mix the coke therewith. Air or other suitable gas is introduced above the molten mass through the tuyères 14 for burning the combustible gases resulting from the reducing reactions between the coke and metallic oxides; the volume of this oxidizing gas being so proportioned that a neutral or slightly reducing atmosphere is maintained above the molten mass.

While it is convenient and generally advantageous to carry out the selective reduction treatment in the same apparatus as the preceding intensive oxidation treatment, this is not necessary. The molten oxidized ore resulting from the oxidation treatment may accordingly be transferred to another furnace designed particularly for the practice of the selective reduction treatment.

The reducing treatment effects the reduction of copper oxide to metallic copper and of magnetite to ferrous oxide, with perhaps some small reduction of the latter to metallic iron. Any metallic iron formed, and any copper sulphide present, will mix with the metallic copper. Where the melted oxidized ore, resulting from the intensive oxidation treatment, contains substantially all of the copper in the form of sulphide, the reducing operation is preferably conducted so as to form a certain amount of metallic iron which will combine with the copper sulphide to form a matte-like product. In any case, the reducing treatment produces a copper product which may consist for the most part of metallic copper, or may consist for the most part of matte, or may be of any intermediate composition. The reducing treatment also removes by volatilization a further portion of the zinc not volatilized in the preceding oxidizing treatment. The bulk of the iron goes to form an iron oxide slag. The viscosity and melting point of the iron oxide slag may be appropriately lowered, as for example, by the addition of such fluxes as fluor-spar. Due to their different specific gravities, the molten copper product and the molten iron oxide slag may be separated by pouring the charge through a skimming door, or by tapping through holes of different elevations.

The molten copper product of the reducing operation may be conveniently further treated in an ordinary copper converter. If the product is relatively low in iron no flux is necessary. On the other hand, suitable fluxing material, such as silicious matter, may be added to the converter, if desired or necessary. The converter is blown in the usual manner, until all of the iron has been converted into molten oxides or slags thereof, and the copper is in the form of blister copper containing substantially all of the gold and silver present in the ore with traces of other elements. The converter is poured in the usual manner, the blister copper being cast into slabs and the slag being returned to the tilting furnace in which the raw ore is initially treated.

The molten iron oxide slag resulting from the selective reducing operation in the tilting furnace is conducted to an iron reduction furnace, which may advantageously be of the same general type as the tilting furnace illustrated in the drawings. The furnace (still hot from a preceding operation) is positioned so that the charge of molten slag submerges the tuyères, and a reducing gas, preferably preheated to as high a temperature as practicable, is blown through the tuyères into the furnace. Provision is made for the introduction into the furnace, above the level of the molten charge therein, of air or other oxidizing gas, preferably preheated to a temperature of 1200° F., in sufficient amount to combine with the reducing gas that passes unconsumed through the molten charge. The combustion of the reducing gas above the molten charge is regulated to provide a slightly reducing or neutral atmosphere above the charge, and the heat of combustion is utilized in maintaining the desired high temperature within the furnace. The reducing furnace is also preferably provided with fuel burners as a supplementary source of heat. The iron is reduced to the metallic state, and will contain substantially all of the copper dissolved in the slag undergoing treatment. Thus, the iron may contain from 0.1 to 1.5% copper, and will be relatively low in carbon, usually less than 0.1%.

It is economically advantageous to use natural gas as the reducing agent in the iron reduction operation. Such a natural gas will consist for the most part of hydrocarbons, principally methane. Other gaseous reducing agents are, of course, available for the purpose. While I now prefer to employ a gaseous reducing agent, solid or liquid carbonaceous or equivalent reducing agents may be utilized, preferably in finely divided or atomized form so that they may be blown into the molten mass in the furnace.

The slag from the iron reduction furnace is a calcium alumino-silicate and may be economically worked up into Portland cement. The gaseous product of the iron reduction furnace will consist for the most part of nitrogen, carbon dioxide, water vapor and such volatile metallic constituents (zinc etc.) as have escaped volatization in the preceding treatments. The heat of this gaseous product is conserved in waste heat boilers, or the like, and in heat interchange apparatus for heating the reducing gas and air supplied to the furnace. The dust and fume in the gaseous product is collected in a bag house, or other appropriated fume-collecting apparatus, and treated for the recovery of its valuable constituents, in most cases mainly zinc oxide.

The gaseous products of the intensive oxidation and selective reducing operations are conducted from the tilting furnace to waste heat boilers, where a portion of their heat energy is utilized to generate steam. Sufficient heat is retained in the gases exiting from these boilers to preheat the air, or other oxidizing gas, used in the tilting furnace operations, say to a temperature of approximately 1000° F. The gases, now relatively cool, are next passed through a baghouse or other dust and fume-collecting apparatus. The fume product collected is appropriately treated for the recovery of its valuable metallic constituents principally zinc, lead, cadmium, selenium etc. The gas exiting from the fume-collecting apparatus consists for the most part of nitrogen and sulphur dioxide. The sulphur dioxide may be concentrated, thereby permitting the production of marketable nitrogen gas, and the concentrated sulphur dioxide may be appropriately treated, preferably for the recovery of sulphur in elemental form. The concentration of the sulphur dioxide gas is not necessary, since the gas exiting from the fume-collecting apparatus may be directly subjected to appropriate treatment for the recovery of its sulphur content as elemental sulphur, or as sulphuric acid, or as any other marketable sulphur product.

As a specific example of the practice of the invention, I will take the run-of-mine ore from the United Verde Copper Co. mine in Arizona. The following may be taken as representative analyses of the ore:—

*Metallurgical analysis of ore*

| Oz. Au | Oz. Ag | Percent Cu | Percent Zn | Percent $SiO_2$ | Percent $Al_2O_3$ | Percent Fe | Percent CaO | Percent S |
|---|---|---|---|---|---|---|---|---|
| 0.03 | 1.35 | 2.0 | 6.0 | 10.1 | 1.3 | 35.2 | 0.6 | 42.0 |

*Mineralogical analysis of ore*

| Percent $CuFeS_2$ | Percent ZnS | Percent $FeS_2$ | Percent Schist | Percent quartz | Percent $CaCO_3$ |
|---|---|---|---|---|---|
| 5.8 | 9.0 | 69.4 | 5.2 | 8.7 | 0.7 |

Assuming the treatment of 3000 tons of such an ore per day, there is introduced along with that ore into the tilting furnace about 290 tons of lime (CaO). This amount of lime may be obtained from the calcination in ordinary lime kilns of about 560 tons of lime rock ($CaCO_3$). The lime rock might be directly added to the tilting furnace, although this presents certain disadvantages on account of the evolution of large volumes of carbon dioxide gas and the inclusion of such gas in the gaseous product of the tilting furnace. The oxidizing air blast is preheated to a temperature of about 1000° F., and introduced into the furnace under a pressure sufficient to deliver the required volume against the resistance encountered.

When the oxidizing treatment is completed, about 60 tons of coke, or other appropriate reducing agent, are added for the selective reducing operation. Since the combustion of the gaseous product of the oxidizing treatment will contain (principally as $SO_2$) substantially all of the sulphur in the ore, whereas the gaseous product of the selective reducing operation will contain practically no sulphur dioxide, it may be desirable in some cases to subject the two gaseous products to somewhat different subsequent treatments. Thus, during the reducing treatment, the gases exiting from the heat exchanger of the tilting furnace flue system may be conveyed to the bag house in the flue system of the iron reducing furnace.

The final products of the selective reduction treatment in the tilting furnace are approximately 65 tons of a molten impure copper product and 2050 tons of ferrous oxide slag analyzing approximately 0.5% Cu, 15.4% $SiO_2$, 2.0% $Al_2O_3$, 63.4% FeO, 15.0% CaO, and minor percentages of zinc, sulphur etc. The conversion of the impure copper product results in the production of about 50 tons of blister copper containing about 4050 ounces of silver and about 90 ounces of gold.

The reduction of the 2050 tons of iron slag requires approximately 8,000,000 cubic feet of natural gas (principally methane) and roughly 33,000,000 cubic feet of air, both heated to a temperature of approximately 1200° F. From this operation approximately 1000 tons of iron, containing about 0.1 to 1.5% copper, are obtained and about 670 tons of calcium alumino-ferro-silicate slag. This slag appropriately treated in a cement plant with about 1000 tons of lime rock will produce approximately 6000 barrels (380 pounds per barrel) of Portland cement. The temperature of the gaseous product of the iron reducing furnace will be approximately 2700° F., and its heat energy is sufficient to produce 2,800,000 pounds of high pressure steam in waste heat boilers and to raise the temperature of the gaseous reducing agent and the air to a temperature of about 1200° F.

Roughly, some 200,000,000 cubic feet of air are blown into the tilting furnace in treating the 3000 tons of ore. Approximately the same volume of gaseous product is delivered from the furnace, at a temperature of about 2200 to 2700° F. The heat of this gaseous product will produce about 4,500,000 pounds of high pressure steam and will preheat all of the air blown into the tilting furnace to a temperature of 1000° F. The fume product collected is of relatively high grade and can be very economically treated for the selective separation and recovery of its various metallic constituents. The gas exiting from the fume collecting apparatus contains approximately 14% sulphur dioxide. Because of the relatively large volume of this gas, I now prefer to concentrate the sulphur dioxide, with the attendant recovery of nitrogen, prior to the treatment thereof for the recovery of sulphur.

While it is now my preferred practice to leave a part of the molten product of the oxidizing or selective reduction treatments in the tilting furnace as a nucleus or starting bath for the following oxidizing treatment, the furnace may, if desired, be entirely emptied and a starting bath obtained from the ore itself. To this end an appropriate amount of ore is introduced into the furnace and heated by means of the burners 23, sufficient combustion fuel for beginning operations being supplied to these burners. The ore will be melted or liquated as in an ordinary reverberatory furnace, and when a sufficient quantity of molten bath has been formed the oxidizing treatment will be conducted as hereinbefore described.

The invention is applicable to the treatment of a wide variety of sulphide ores. The specific example and the detailed flow sheet hereinbefore described are to be understood as illustrative of the invention and in no sense restrictive of its scope or application. Since it is characteristic of the intensive oxidizing treatment that the non-volatile constituents of the resulting oxidized ore be melted, it may be necessary in treating some ores, whose earthy or gangue constituents are highly heat-resistant, to add with the ore appropriate fluxes, such as lime, silica, fluor spar and the like, in order to insure melting of the oxidized ore at the temperatures attainable in the operation. In some ores, the ratio of earthy or gangue constituents to sulphides may be so high as to render the ore deficient in fuel value for the desired autogenous operation of intensive oxidation. Such ores may advantageously be subjected to a preliminary concentration for the removal of an appropriate amount of the earthy or gangue constituents, or may be blended or mixed with other ore in which the ratio of gangue to sulphides is relatively low. A deficiency of the ore in fuel value may also be corrected by the use of extraneous fuel, such as coke, oil or gas, during the intensive oxidation.

The reducing furnace for the treatment of the iron oxide slag may be heated exclusively by fuel, such as the combustion of hydrocarbon gas as hereinbefore described, or may be heated partially or wholly by electric energy. It may be desirable to use some electric heating in the operation of this furnace, as for example, by the medium of graphite electrodes dipping into or arcing to the molten bath. The utilization of electric heating reduces the volume of gaseous product obtained from the operation, and also enables the attainment of higher temperatures, thereby permitting the formation and fusion of more basic slags, such as di-calcic silicate slag instead of calcium mono-silicate slag. The di-calcic silicate slag more nearly resembles in composition the tri-calcic silicate of cement and furthermore decrepitates on cooling, both of which features are of advantage in a subsequent cement making operation.

One of the important advantages of the invention is that it permits the mining of a mixed ore body in its entirety rather than by the heretofore customary selective practice of mining those portions of the ore body relatively high in one particular metal value. The invention provides an economic and practical method of recovering all of the metal values from run-of-mine ore, without the necessity of differential concentration or other separatory treatment. In its complete aspect, the invention provides a treatment for sulphide ores in which all of the valuable metals and metalloids are recovered in marketable form; in which no worthless gangue or slag is produced; and in which there is no objectionable smoke or fume. Such treatment yields so many products that ore deposits not now of economic value will become profitable; also some deposits now being treated at a small profit can continue to produce in spite of increased competition of vast new foreign copper ore discoveries.

I claim:

1. The method of treating a mixed sulphide ore containing iron and copper which comprises subjecting the ore to an intensive oxidation and thereby removing in the resulting gaseous product the bulk of the sulphur originally present in the ore and forming a molten product of the resulting oxidized ore in which a large part of the iron is present in the form of magnetite, subjecting said molten product to a selective reduction treatment with the production of a molten copper product and a molten iron oxide product containing insufficient silica to form an iron silicate slag with the iron oxide thereof, subjecting said molten copper product to a converting operation with the production of blister copper, and subjecting said molten iron oxide product to the action of a reducing agent in the presence of appropriate slag-forming constituents and thereby obtaining a metallic iron product and a slag product.

2. A pyrometallurgical process of dissecting a mixed sulphide ore containing iron and copper which comprises blowing an oxidizing gas through a molten mass to which the ore is added until the bulk of the sulphur originally present in the ore has been removed as a gaseous product and the resulting oxidized ore has been melted, subjecting the resulting molten mass to the action of a reducing agent until substantially all of the copper has been segregated in a molten copper product and the bulk of the iron is in the form of a molten iron oxide product, subjecting the molten copper product to a converting operation with the production of blister copper, and subjecting the molten iron oxide product to the action of a reducing agent in the presence of appropriate slag-forming constituents and thereby obtaining a metallic iron product and a slag product.

3. The method of treating a mixed sulphide ore containing iron and copper which comprises subjecting the ore to an intensive oxidation with the production of (1) a gaseous product containing the bulk of the sulphur originally present in the ore and (2) a molten product containing the resulting oxidized ore with a large part of the iron in the form of magnetite, subjecting said molten product to a selective reduction treatment with the production of (1) a molten copper product and (2) a molten iron product with a large part of the iron in the form of ferrous oxide, subjecting said molten copper product to a converting operation with the production of blister copper, and subjecting the molten iron product to the action of a reducing agent in the presence of appropriate slag-forming constituents and thereby obtaining a metallic iron product and a slag product.

4. The method of treating a mixed sulphide ore containing iron and zinc which comprises subjecting the ore to an intensive oxidation and thereby removing in the resulting gaseous product the bulk of the sulphur and some of the zinc originally present in the ore and forming a molten product of the resulting oxidized ore in which a large part of the iron is present in the form of magnetite, and subjecting said molten product to a selective reduction treatment in the course of which there is produced (1) a gaseous product containing a further part of the zinc originally present in the ore and (2) a molten iron oxide product containing insufficient silica to form an iron silicate slag with the iron oxide content thereof and (3) a molten product of another metal.

5. The method of treating a mixed sulphide ore containing iron and zinc which comprises subjecting the ore to an intensive oxidation and thereby removing in the resulting gaseous product the bulk of the sulphur and some of the zinc originally present in the ore and forming a molten product of the resulting oxidized ore in which a large part of the iron is present in the form of magnetite, subjecting said molten product to a selective reduction treatment in the course of which there is produced (1) a gaseous product containing a further part of the zinc originally present in the ore and (2) a molten iron oxide product containing insufficient silica to form an iron silicate slag with the iron oxide content thereof, and subjecting said molten iron oxide product to a further reduction treatment in the course of which there is recovered in the resulting gaseous product a still further part of the zinc originally present in the ore.

6. The method of treating a mixed sulphide ore containing iron, copper and zinc which comprises subjecting the ore to an intensive oxidation and thereby removing in the resulting gaseous product the bulk of the sulphur and some of the zinc originally present in the ore and forming a molten product of the resulting oxidized ore, subjecting said molten product to a selective reduction treatment with the production of (1) a gaseous product containing a further part of the zinc originally present in the ore and (2) a molten copper product and (3) a molten iron oxide product containing insufficient silica to form an iron silicate slag with the iron oxide thereof, and treating said molten copper product for the production of metallic copper.

7. The method of treating a mixed sulphide ore containing iron, copper and zinc which comprises subjecting the ore to intensive oxidation with the production of (1) a gaseous product containing the bulk of the sulphur and some of the zinc originally present in the ore and (2) a molten product containing the resulting oxidized ore, subjecting said molten product to a selective reduction treatment with the production of (1) a gaseous product containing a further part of the zinc originally present in the ore and (2) a molten copper product and (3) a molten iron oxide product, and subjecting said copper and iron oxide products to appropriate subsequent treatments for the production of metallic copper and metallic iron respectively.

8. The method of treating a mixed sulphide ore containing iron, copper and zinc which comprises subjecting the ore to intensive oxidation with the production of (1) a gaseous product containing the bulk of the sulphur and some of the zinc originally present in the ore and (2) a molten product containing the resulting oxidized ore, subjecting said molten product to a selective reduction treatment with the production of (1) a gaseous product containing a further part of the zinc originally present in the ore and (2) a molten copper product and (3) a molten iron oxide product, and subjecting said molten iron oxide product to a further reduction treatment with the production of (1) a gaseous product containing a still further part of the zinc originally present in the ore and (2) a molten metallic iron product and (3) a molten slag product.

9. The method of treating a mixed sulphide ore containing iron and copper which comprises subjecting the ore to intensive oxidation until a molten product containing copper sulphide and iron oxide largely in the form of magnetite is produced, subjecting the molten product to a reduction treatment to form separable copper and iron oxide products, and subjecting the copper and iron oxide products to appropriate subsequent treatments for the production of metallic copper and metallic iron.

10. The method of treating a mixed sulphide ore containing iron and copper which comprises subjecting the ore to intensive oxidation until a molten product containing metallic copper and iron oxide largely in the form of magnetite is produced, subjecting the molten product to a reduction treatment to form separable copper and iron oxide products, and subjecting the copper and iron oxide products to appropriate subsequent treatments for the production of metallic copper and metallic iron.

11. The process for treating ore containing iron sulphide which comprises subjecting the solid ore to intensive oxidation until the ore is molten and a molten iron oxide product in which a large proportion of the iron is present in the form of magnetite is formed, thereby to effect substantially complete removal of the sulphur, and reducing the iron oxide product to form a substantially sulphur-free metallic iron product.

12. The process for treating ore containing iron sulphide which comprises subjecting the solid ore to intensive oxidation until the ore is molten and a molten iron oxide product in which a large proportion of the iron is present in the form of magnetite is formed, thereby to effect substantially complete removal of the sulphur and to form a gaseous product containing the bulk of the sulphur originally present in the ore, treating the gaseous product to recover elemental sulphur, and treating the iron oxide product to recover a substantially sulphur-free metallic iron product.

13. The method of producing metallic iron which comprises subjecting a charge containing solid iron sulphide to intensive oxidation until the charge is molten and a molten iron oxide product in which a large proportion of the iron is present in the form of magnetite is formed, thereby to effect substantially complete removal of the sulphur, and treating the iron oxide product to produce metallic iron.

14. The method of recovering iron from iron sulphide which comprises subjecting a charge containing solid iron sulphide to intensive oxidation in the presence of insufficient silica to form an iron silicate slag with all the iron present until the charge is molten and an iron oxide product in which a large proportion of the iron is present in the form of magnetite is formed, and reducing the iron oxide thus produced to produce a substantially sulphur-free metallic iron product.

15. The method of recovering iron from ore containing sulphides of iron and copper which comprises subjecting a charge containing solid ore to intensive oxidation to melt the charge and convert the iron sulphide to magnetite and thereby effect the substantially complete removal of sulphur, subjecting the resulting product to a selective reduction treatment to form separable copper and iron oxide products, and subjecting the iron oxide product to a reduction treatment to produce metallic iron.

16. The method of treating a mixed sulphide ore containing iron and copper which comprises subjecting a charge containing solid ore to an intensive oxidation and thereby melting the ore, removing in the resulting gaseous product the bulk of the sulphur originally present in the ore and forming a molten product of the resulting oxidized ore in which a large part of the iron is present in the form of magnetite, subjecting said molten product to a selective reduction treatment with the production of a molten copper product and a molten iron oxide product containing insufficient silica to form an iron silicate slag with the iron oxide thereof, and subjecting said molten iron oxide product to the action of a reducing agent in the presence of appropriate slag-forming constituents and thereby obtaining a metallic iron product and a slag product.

17. The method of treating a mixed sulphide ore containing iron and copper which comprises subjecting a charge containing solid ore to an intensive oxidation and thereby melting the ore, removing in the resulting gaseous product the bulk of the sulphur originally present in the ore and forming a molten product of the resulting oxidized ore in which a large part of the iron is present in the form of magnetite, subjecting said molten product to a selective reduction treatment with the production of a molten copper product and a molten iron oxide product containing insufficient silica to form an iron silicate slag with the iron oxide thereof, subjecting said molten copper product to a converting operation with the production of metallic copper, and subjecting said molten iron oxide product to the action of a reducing agent in the presence of appropriate slag-forming constituents and thereby obtaining a metallic iron product and a slag product.

18. The method of producing iron which comprises subjecting a charge containing solid iron sulphide to intensive oxidation until the charge is molten and a molten iron oxide product is formed and sulphur is substantially completely removed, and subjecting the resulting molten iron oxide product to a reducing treatment until a large proportion of the iron contained therein is reduced to the metallic state.

19. The process for treating solid iron sulphide-bearing material which comprises subjecting the material to intensive oxidation until the material is molten and a molten iron oxide product in which a large proportion of the iron is present in the form of magnetite is formed, thereby to effect substantially complete removal of the sulphur and to form a gaseous product containing substantially all of the sulphur originally present in the material, treating the gaseous product to recover elemental sulphur, and subjecting the molten iron oxide product to a reducing treatment to produce metallic iron.

20. The process for treating ore containing iron sulphide which comprises blowing an oxidizing gas through a molten mass to which the solid ore is added until a molten iron oxide product in which a large proportion of the iron is present in the form of magnetite is formed, and subjecting the resulting molten iron oxide product to a reducing treatment to produce metallic iron.

21. The method of recovering iron from ore containing sulphides of iron and copper which comprises subjecting the solid ore to intensive oxidation until the ore is molten and the iron sulphide is converted to magnetite, thereby to effect the substantially complete removal of sulphur, subjecting the resulting product to a selective reduction treatment to form separable molten copper and iron oxide products, and subjecting the molten iron oxide product to a reduction treatment to produce metallic iron.

22. A process which comprises subjecting a solid charge of iron sulphide-bearing material poor in silica to intensive oxidation until the charge is molten and a molten iron oxide product is formed and sulphur is substantially completely removed, subjecting the resulting molten iron oxide product to a reducing treatment until substantially all of the iron contained therein is reduced to the metallic state, and adding to the charge a basic slag-forming material to form a silicate slag suitable for use in the production of cement.

23. A process according to claim 22 in which at least a portion of the basic slag-forming material is added to the charge prior to the reducing operation.

CHARLES R. KUZELL.